(12) United States Patent
Tonooka et al.

(10) Patent No.: US 9,914,424 B2
(45) Date of Patent: Mar. 13, 2018

(54) INFLATOR AND AIR BAG DEVICE

(71) Applicants: HONDA MOTOR CO., LTD., Tokyo (JP); TAKATA CORPORATION, Tokyo (JP)

(72) Inventors: Daiei Tonooka, Wako (JP); Norihisa Okada, Tokyo (JP); Hideo Tsukada, Tokyo (JP); Akira Tsujie, Tokyo (JP)

(73) Assignees: HONDA MOTOR CO., LTD., Tokyo (JP); TAKATA CORPORATION, Tokyo (JP)

( * ) Notice: Subject to any disclaimer, the term of this patent is extended or adjusted under 35 U.S.C. 154(b) by 0 days.

(21) Appl. No.: 15/226,252

(22) Filed: Aug. 2, 2016

(65) Prior Publication Data

US 2017/0036640 A1 Feb. 9, 2017

(30) Foreign Application Priority Data

Aug. 6, 2015 (JP) .................................. 2015-156280

(51) Int. Cl.
*B60R 21/261* (2011.01)
*B60R 21/217* (2011.01)

(52) U.S. Cl.
CPC ........ *B60R 21/261* (2013.01); *B60R 21/2171* (2013.01)

(58) Field of Classification Search
CPC ............ B60R 21/2171; B60R 21/2176; B60R 21/261
See application file for complete search history.

(56) References Cited

U.S. PATENT DOCUMENTS

| 5,308,108 A | 5/1994 | Rion |
| 5,458,364 A * | 10/1995 | Mueller ............... B60R 21/2171 280/728.2 |
| 8,113,537 B2 * | 2/2012 | Fechner .................. B60R 21/26 280/728.2 |
| 9,573,550 B1 * | 2/2017 | Mitchell ............... B60R 21/213 |
| 2003/0141705 A1 * | 7/2003 | Oka ...................... B60R 21/2176 280/728.2 |
| 2004/0090049 A1 * | 5/2004 | McCann ............. B60R 21/2171 280/728.2 |
| 2008/0084051 A1 * | 4/2008 | Okuhara ............. B60R 21/2171 280/728.2 |

FOREIGN PATENT DOCUMENTS

| DE | 10 2008 026 795 A1 | 12/2009 |
| EP | 0790154 B1 | 11/2005 |
| JP | 2003-260997 A | 9/2003 |
| JP | 2015-37919 A | 2/2015 |
| WO | WO2015016324 A1 * | 2/2015 |

* cited by examiner

*Primary Examiner* — Drew J Brown
(74) *Attorney, Agent, or Firm* — Westerman, Hattori, Daniels & Adrian, LLP

(57) ABSTRACT

An inflator (3) includes an inflator main body (10) which is has a tubular shape and has a plurality of gas injection holes (11) on a circumferential surface, and a steel-made collar member (20) which has a gas jet reception part (28) that is disposed so as to face a gas injection holes formation area (R) of the inflator main body (10) across a space.

9 Claims, 7 Drawing Sheets

INFLATOR AND AIR BAG DEVICE

BACKGROUND OF THE INVENTION

Field of the Invention

The present invention relates to an inflator and an air bag device.

Priority is claimed on Japanese Patent Application No. 2015-156280, filed Aug. 6, 2015, the content of which is incorporated herein by reference.

Description of Related Art

An air bag device is provided with a bag body to be a cushion and an inflator to supply a gas to inflate the bag body. For example, Patent Document 1 discloses an air bag device provided with an inflator main body which is tubal and has a plurality of gas injection holes on the circumferential surface. Such an air bag disclosed in Patent Document 1 adopts a structure to install a hook at a deflector which rectifies injected gas from the inflator, in order to prevent misalignment of the position with the bag body in the vicinity of the installation place of the inflator main body.

[Patent Document 1]

Japanese Patent Application, Publication No. 2015-37919

SUMMARY OF THE INVENTION

In Patent Document 1, the deflector is disposed so as to abut the circumferential surface of the inflator main body, causing a part of the gas injection holes formed on the circumferential surface of the inflator main body blocked by the deflector. In such a case, it may be difficult for the gas generated inside the inflator main body to be smoothly injected out towards the outside of the inflator main body. As a result, the velocity of the inflation and expansion of the bag body may be reduced slightly.

The present invention allows the gas generated inside the inflator main body to be smoothly injected out towards the outside of the inflator main body, even in cases where the collar member of the deflector or the like is fixed to the inflector main body in the inflator and the air bag device.

Aspects of the present invention adopt following structures.

According to a first aspect of the present invention, an inflator (inflator 3 of the embodiment, for example) includes an inflator main body (inflator main body 10 of the embodiment, for example) which has a tubular shape and has a plurality of gas injection holes (gas injection holes 11 of the embodiment, for example) on a circumferential surface, and a collar member (steel-made collar member 20 of the embodiment, for example) which has a gas jet reception part (gas jet reception part 28 of the embodiment, for example) that is disposed so as to face a formation area of the gas injection holes (gas injection holes formation area R of the embodiment, for example) of the inflator main body across a space.

In the first aspect of the present invention, the collar member is disposed so as to face the formation area of the gas injection holes of the inflator main body across a space. In this case, the collar member is prevented from directly block the gas injection holes, and also the collar member is prevented from obstructing the gas injection from the gas injection holes. Therefore, according to the present aspect of the present invention, it is possible to inject the gas from the inflator main body smoothly, even in the cases where the collar member of the deflector or the like is fixed to the inflector main body.

According to a second aspect of the present invention, in the above-described first aspect of the invention, the collar member has abutting parts (curb part 23 and linear rib 24 of the embodiment, for example) which abut the circumferential surface of the inflator main body at positions of point symmetry at an axis core of the inflator main body (axis core L of the embodiment, for example) as a center, in a cross section orthogonal to the axis core of the inflator main body.

When the gas injection holes are locally blocked by the abutting parts, injection amount of the gas seen from the axis core direction is not even in the circumferential direction of the inflator main body, and may generate thrust force to the inflator main body. When the thrust force is generated in this manner, position of the inflator main body may be misaligned. On the contrary, in the second aspect of the present invention, the abutting parts are provided at positions of point symmetry at an axis core of the inflator main body as a center. Thus, even when the gas injection holes are locally blocked by the abutting parts, gas injection amount decrease in the same manner on both sides interposing the axis core of the inflator main body. Due to this, reaction forces of gas injection received on both places interposing the axis core of the inflator main body is kept constant, preventing the generation of the thrust force with respect to the inflator main body. Therefore, according to the aspect of the present invention, it is possible to support the inflator main body stably even at the time of the gas injection.

According to a third aspect of the present invention, in the above-described first and second aspects of the invention, the gas jet reception part has notch parts (notch opening 21, bottom bore opening 22 and end part notch 26 of the embodiment, for example) on both sides interposing the axis core, in the cross section orthogonal to the axis core of the inflator main body.

In the third aspect of the present invention, by the collar member with notch parts, even smoother gas injection is possible in the areas where notch parts are provided. Furthermore, the notch parts are provided on the both sides interposing the axis core in the cross section orthogonal to the axis core of the inflator main body. Due to this, reaction forces of gas injection received on both places interposing the axis core of the inflator main body counterbalances, preventing the generation of the thrust force with respect to the inflator main body. Therefore, according to the aspect of the present invention, it is possible to make the gas injection even smoother, and also to support the inflator main body stably even at the time of the gas injection.

According to a fourth aspect of the present invention, in the above-described third aspect of the invention, the collar member has a curved rib (curved rib 25 of the embodiment, for example) which is formed in a place displaced in the axis core direction of the inflator main body with respect to at least one among two of the notch parts and extends in a circumferential direction of the inflator main body.

For example, when mounting the collar member by expanding diameter to the inflator main body of the tubular shape, due to the low strength of the surrounding portions of the notch part, plastic deformation maybe caused to such portions. In such case, it causes yield to decrease. On the contrary, in the fourth aspect of the present invention, the curved rib extending in a circumferential direction of the inflator main body is provided in the surroundings of the notch part, which enhances the strength of the surroundings of the notch part, preventing the plastic deformation of the collar member at the time of mounting. Furthermore, it is possible to adjust the restoring force of the collar member by the curved rib when the diameter of the collar member is expanded.

According to a fifth aspect of the present invention, in the above-described third or fourth aspect of the invention, the collar member has a linear rib (linear rib 24 of the embodiment, for example) which is formed in a place displaced in the circumferential direction of the inflator main body with respect to at least one among two of the notch parts and extends in a direction of the axis core of the inflator main body.

In the fifth aspect of the present invention, the linear rib extending in a direction of the axis core of the inflator main body is provided in the surroundings of the notch part, which enhances the strength of the surroundings of the notch part, preventing the plastic deformation of the collar member at the time of mounting. Furthermore, it is possible to adjust the restoring force of the collar member by the linear rib when the diameter of the collar member is expanded.

According to a sixth aspect of the present invention, in any one of the above-described first to fifth aspect of the invention, a cover member (resin-made collar member 30 in the embodiment, for example) which is fixed to the inflator main body and covers an end part of the inflator main body from outside in a radial direction of the inflator main body is included, and the collar member has a position restriction part (projection part 27 of the embodiment, for example) which is configured to restrict a displacement by abutting on the cover member with respect to the inflator main body.

In the sixth aspect of the present invention, the position restriction part prevents the displacement of the collar member with respect to the inflator main body. Due to this, this aspect of the present invention enables to prevent the collar member from displacing with respect to the inflator main body at the time of the gas injection. Furthermore, it is possible to easily position the collar member with respect to the inflator main body at the time of assembly by using the position restriction part as a mark.

According to a seventh aspect of the present invention, a bag body and an inflator configured to inject a gas to inflate the bag body are included, and any one of the above-described first to sixth aspect of the invention is included as the inflator.

In the seventh aspect of the present invention, the inflator of any one of the above-described first to sixth aspect of the invention is included. Due to this, it is possible to inject the gas from the inflator main body and causes the bag body to inflate and expand as designed.

According to the inflator and air bag device of the aspects of the present invention, it is possible to inject the gas from the inflator main body smoothly, even in the cases where the collar member of the deflector or the like is fixed to the inflector main body.

BRIEF DESCRIPTION OF THE DRAWINGS

FIG. 4 B is an overall view of the inflator provided in the air bag device of the embodiment of the aspect of the present invention and is a side view seen from an orthogonal direction to the inflation and expansion direction.

FIG. 4 C is an overall view of the inflator provided in the air bag device of the embodiment of the aspect of the present invention and is a bottom plan view seen from an opposite side of the inflation and expansion direction.

FIG. 5 B is a cross-sectional view of the inflator provided in the air bag device of the embodiment of the aspect of the present invention and is a cross-sectional view along B-B line indicated in FIG. 4 A.

DETAILED DESCRIPTION OF THE INVENTION

Figure 1:
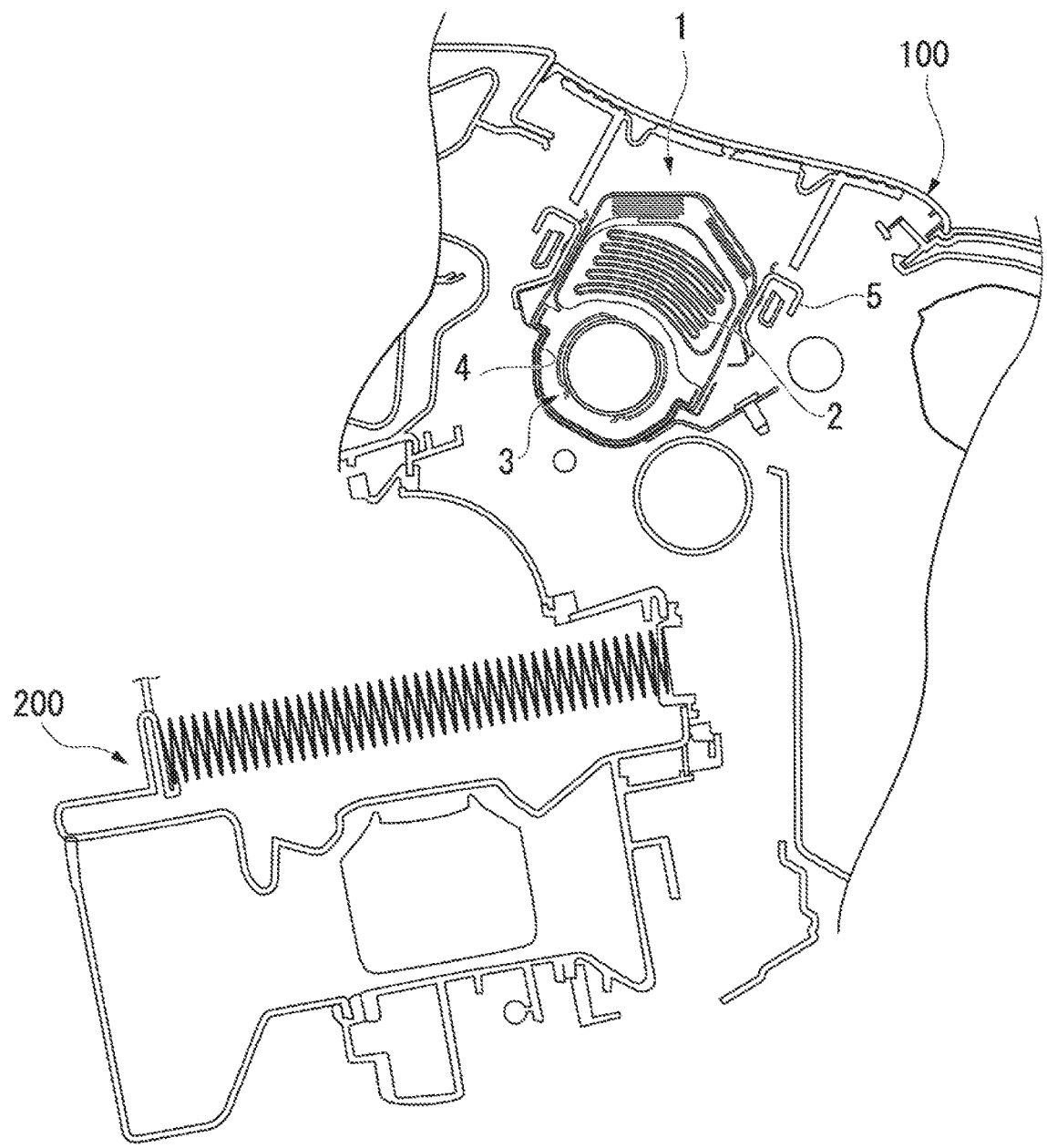
FIG. 1 is a partial cross-sectional view of a vehicle in which an air bag device of an embodiment of an aspect of the present invention is mounted.

Hereinafter, referring to the drawings, an embodiment of an inflator and an air bag device related to the aspect of the present invention will be described. In the drawings being referred to below, the scale of each member is changed properly so that each member is shown in a recognizable size.

FIG. 1 is a partial cross-sectional view of a vehicle in which an air bag device 1 of present embodiment is mounted. The air bag device 1 of the present embodiment is a SRS (Supplemental Restraint System) for a passenger seat, which is disposed in front of the passenger seat. As shown in FIG. 1, the air bag device 1 of the present embodiment is, for example, disposed inside the dash board 100 and above the air-conditioning unit 200.

Figure 2:
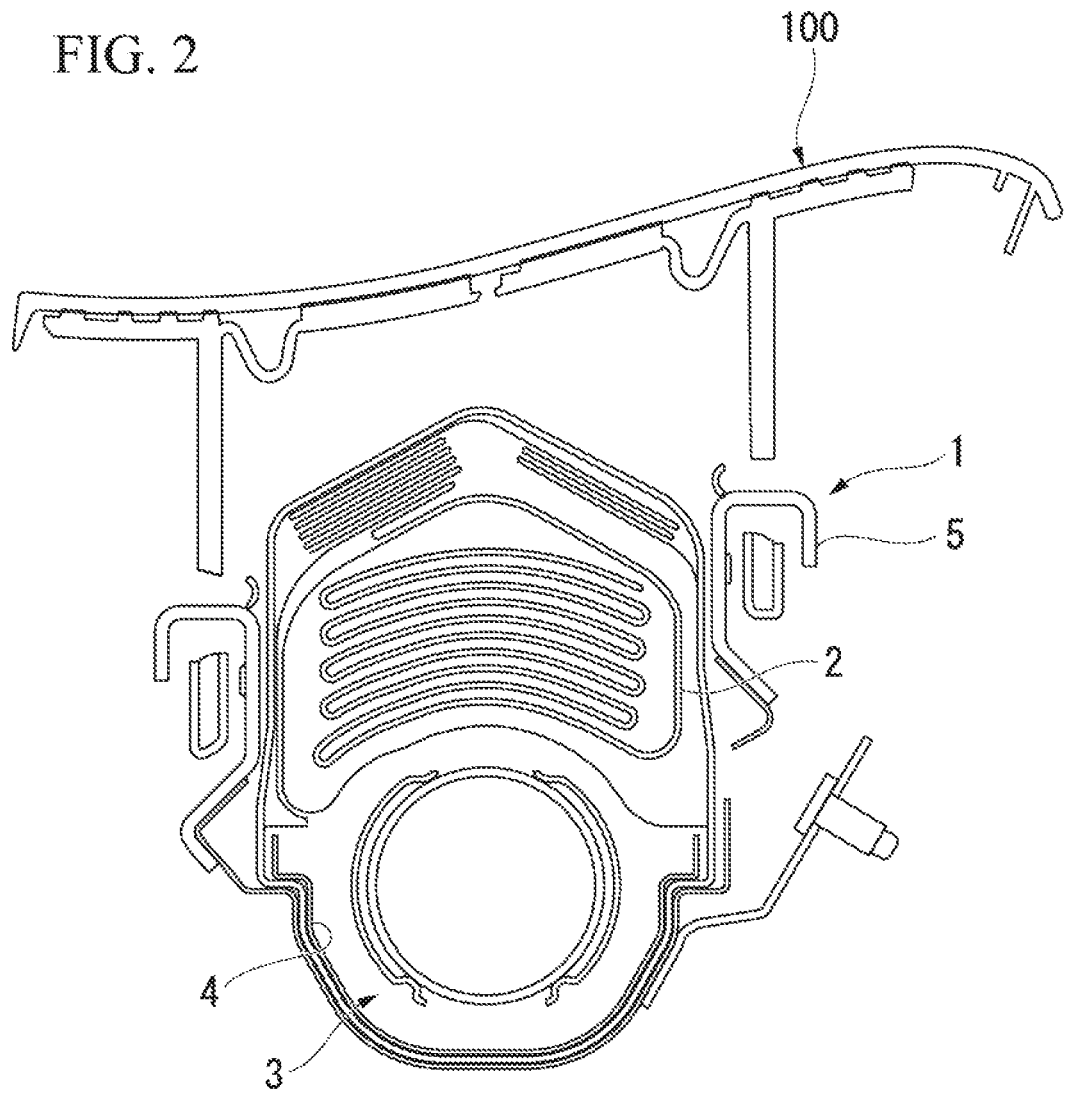
FIG. 2 is a partially magnified view of FIG. 1 including the air bag device of the embodiment of the aspect of the present invention.
Figure 3:
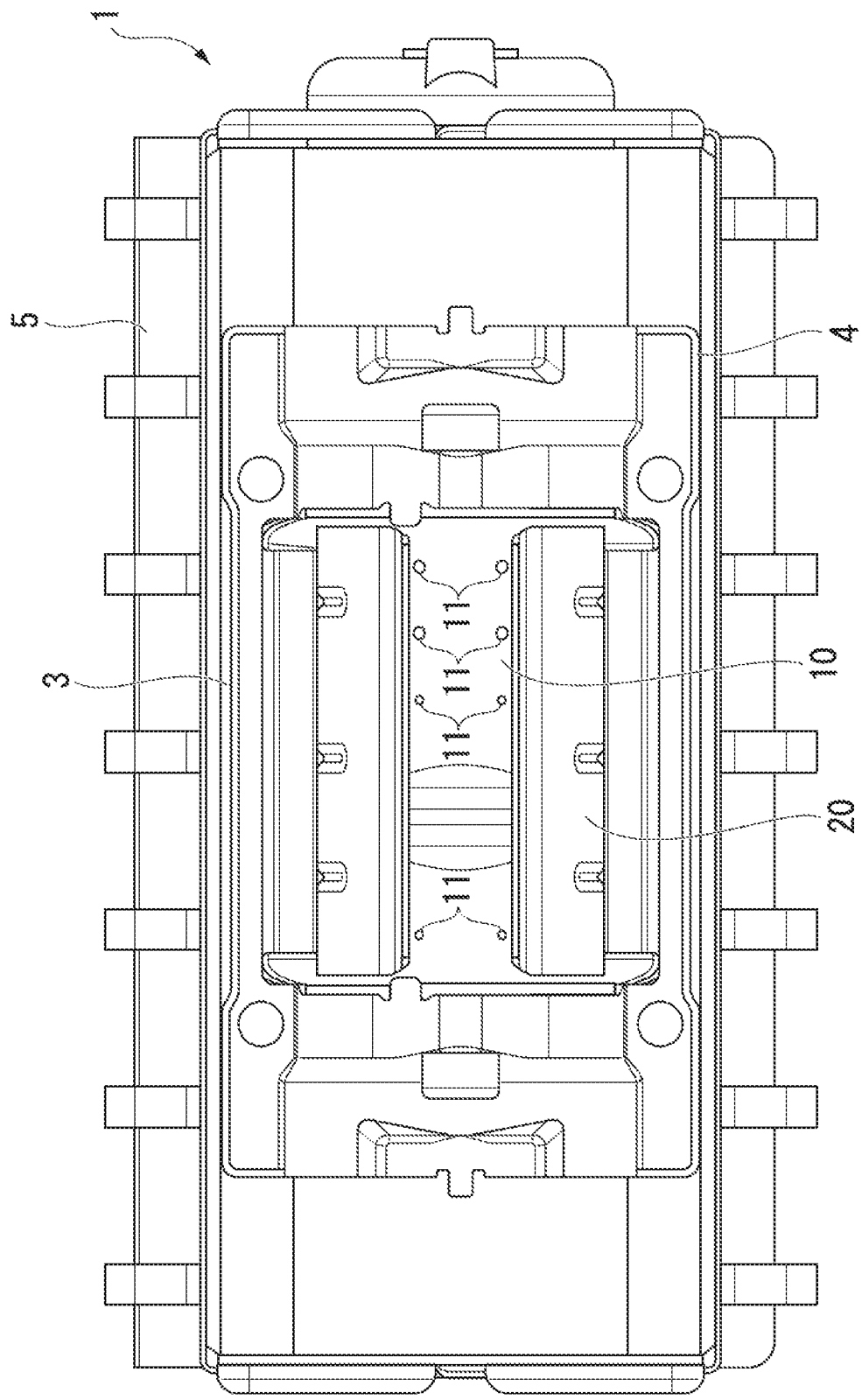
FIG. 3 is partially magnified view of the air bag device of the embodiment of the aspect of the present invention seen from a side of a dash board, in which a bag body is omitted.

FIG. 2 is a partially magnified view of FIG. 1 including the air bag device 1 of the present embodiment. FIG. 3 is partially magnified view of the air bag device 1 of the present embodiment seen from a side of the dash board 100, in which a bag body 2 which is to be referred to below is omitted. As shown in these drawings, the air bag device 1 includes a bag body 2, an inflator 3, a ring retainer 4 and retainer 5. In the description below, a direction in which the bag body 2 is to be inflated and expanded (that is, a direction from retainer 3 towards the passenger seat) is referred to as the inflation and expansion direction, as may be necessary.

The bag body 2 is a component to be inflated and expanded towards the passenger seat at the time of vehicle collision, and support a passenger to alleviate the impact which the passenger may receive. As shown in FIG. 2, this bag body 2 accommodates the inflator 3 inside. And the dash board 100 accommodates the bag body 2 by folding up those portions of the inflation and expansion direction seen from the inflator 3. The bag body 2 like this is inflated by a gas injected out from the inflator 3 and expanded towards the passenger seat side by breaking the dash board 100. For example, this bag body 2 includes a bag-like main panel made of Nylon and a heat cloth laminated and disposed on the main panel, as may be necessary. The heat cloth is a sheet material of high heat resistance, and is installed in the vicinity of the inflator 3, for example, to prevent the high temperature gas injected from the inflator 3 from hitting against the main panel directly.

The inflator 3 is a component to generate a gas by blowing up explosive accommodated inside according to instructions from ECU (Engine Control Unit), for example, and to inject and supply the gas to the bag body 2 to expand the bag body 2. The inflator 3 is substantially in circular tubal shape (cylindrical shape) as a whole, and accommodated inside the bag body 2 so that an axis core direction is along a vehicle width direction. Regarding the inflator 3, details will be described later.

The ring retainer 4 is a component which is disposed between the bag body 2 and the inflator 3. As shown in FIG. 2, the ring retainer 4 is disposed on an opposite side of the inflation and expansion direction of the bag body 2 seen from the inflator 3. The ring retainer 4 as above, by receiving the gas injected towards the opposite side of the inflation and expansion direction of the bag body 2, prevents the gas from directly hitting the bag body 2.

The retainer 5 is a metal-made container, opening in the inflation and expansion direction of the bag body 2, which accommodates the bag body 2 together with the inflator 3 and the ring retainer 4. As the retainer 5 opens in the inflation and expansion direction of the bag body 2, the retainer 5 guides an expansion direction of the bag body 2 towards the passenger seat side. The retainer as above is fixed to the vehicle body by being hooked to the dash board 100, for example. In this way, by fixing the retainer 5 to the vehicle body, the air bag device as a whole is fixed to the vehicle body.

Figure 4A:
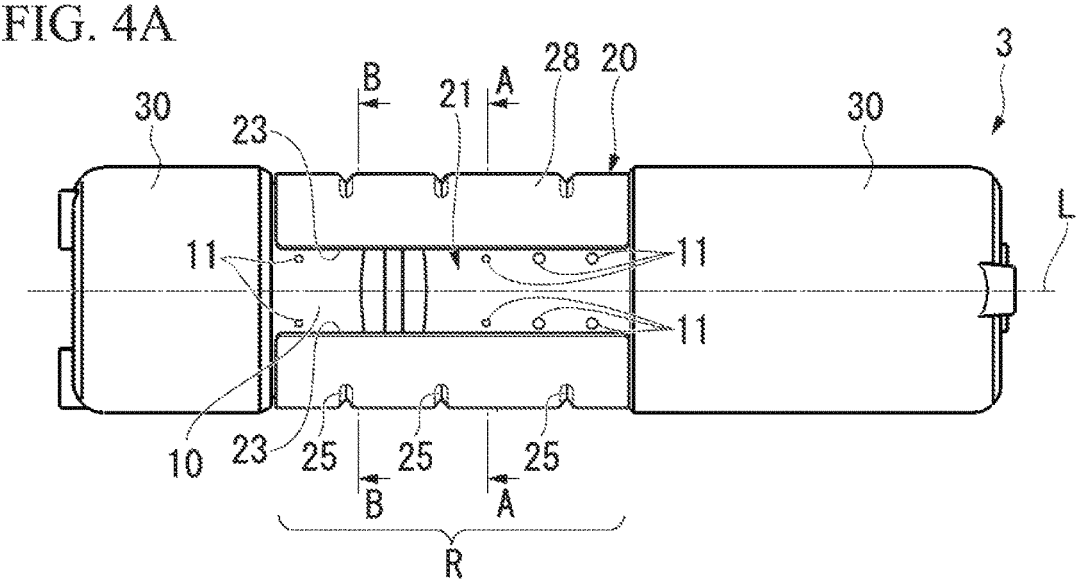
FIG. 4 A is an overall view of an inflator provided in the air bag device of the embodiment of the aspect of the present invention and is a plan view seen from a side of an inflation and expansion direction.
Figure 4B:
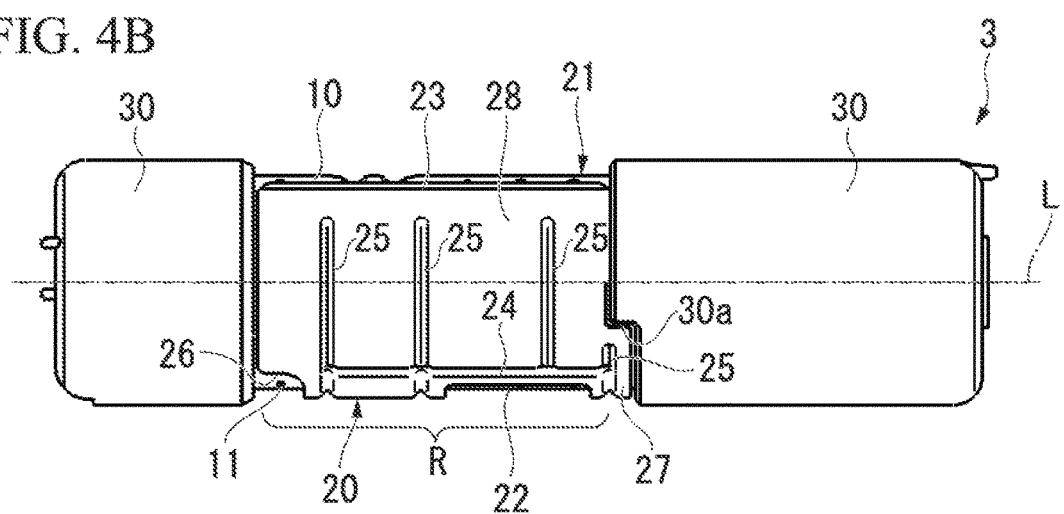
Figure 4C:
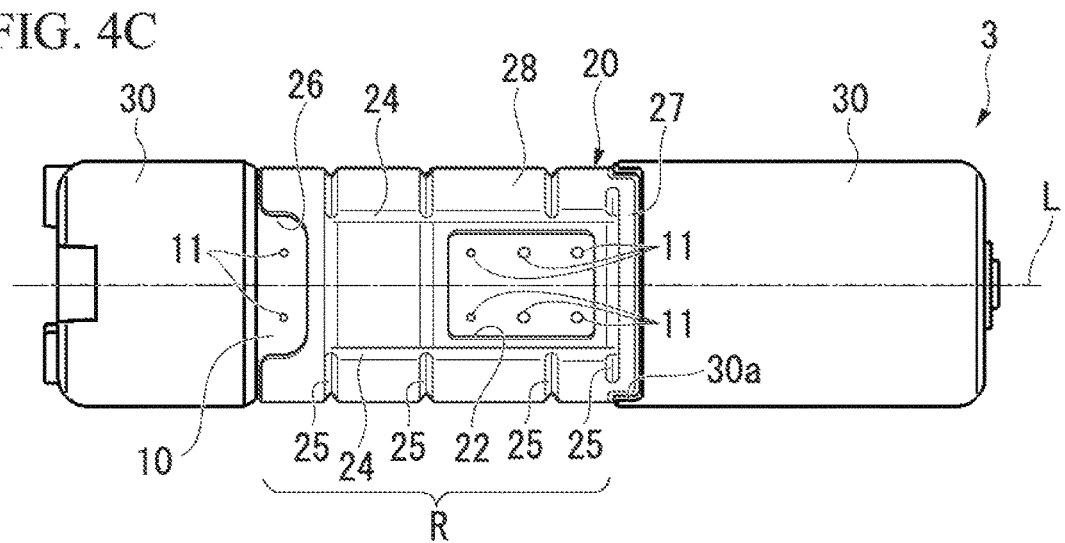
Figure 5A:
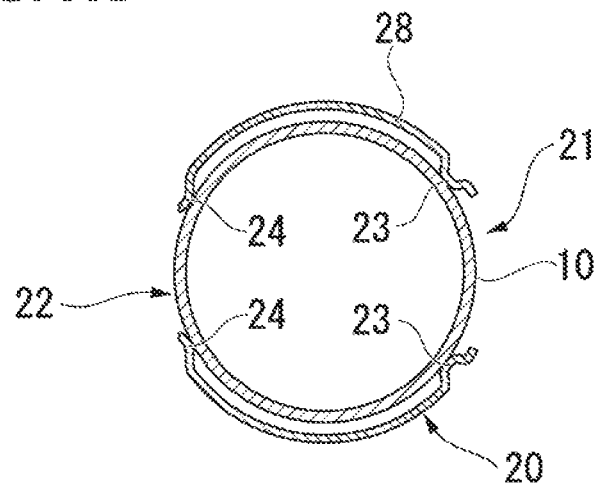
FIG. 5 A is a cross-sectional view of the inflator provided in the air bag device of the embodiment of the aspect of the present invention and is a cross-sectional view along A-A line indicated in FIG. 4 A.
Figure 5B:
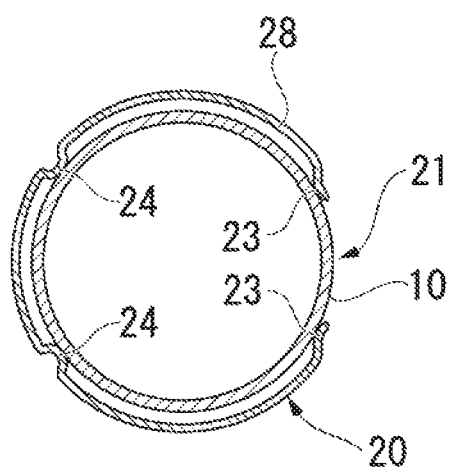

Following, referring to the FIGS. 4 to 7, the inflator 3 will be described more in details. FIG. 4 is an overall view of the inflator 3. FIG. 4 A is a plan view seen from the side of the inflation and expansion direction. FIG. 4 B is a side view seen from the orthogonal direction to the inflation and expansion direction. FIG. 4 C is a bottom plan view seen from the opposite side of the inflation and expansion direction. In addition, FIG. 5 is a cross-sectional view of the inflator 3. FIG. 5 A is a cross-sectional view along A-A line indicated in FIG. 4 A. FIG. 5 B is a cross-sectional view along B-B line indicated in FIG. 4 A.

As shown in FIG. 4, the inflator 3 includes an inflator main body 10, a steel-made collar member 20 and a resin-made collar member 30 (cover member). The inflator main body 10 is a component in substantially a circular tubal shape (cylindrical shape) as a whole. The inflator main body 10 is provided with an accommodation chamber or the like to accommodate the explosive inside and ignition equipment or the like to ignite the accommodated explosive. The inflator main body 10 as above has a multiple number of gas injection holes 11 to inject the gas generated inside towards the outside. The gas injection holes are formed with a predetermined pitch in the circumferential direction and in the axis core direction on the circumferential surface of the inflator main body 10. Thus, the gas generated inside the inflator main body 10 is dispersed and injected out from plural places in the circumferential direction and in the axis core direction. Additionally, in the present embodiment, the gas injection holes 11 are formed in an area of a central part except for end part (area where the resin collar 30 is installed) of the inflator main body 10. Hereinafter, the area of the central part of the inflator main body 10 where the gas injection holes 11 are formed is referred to as gas injection holes formation area R.

Figure 6:
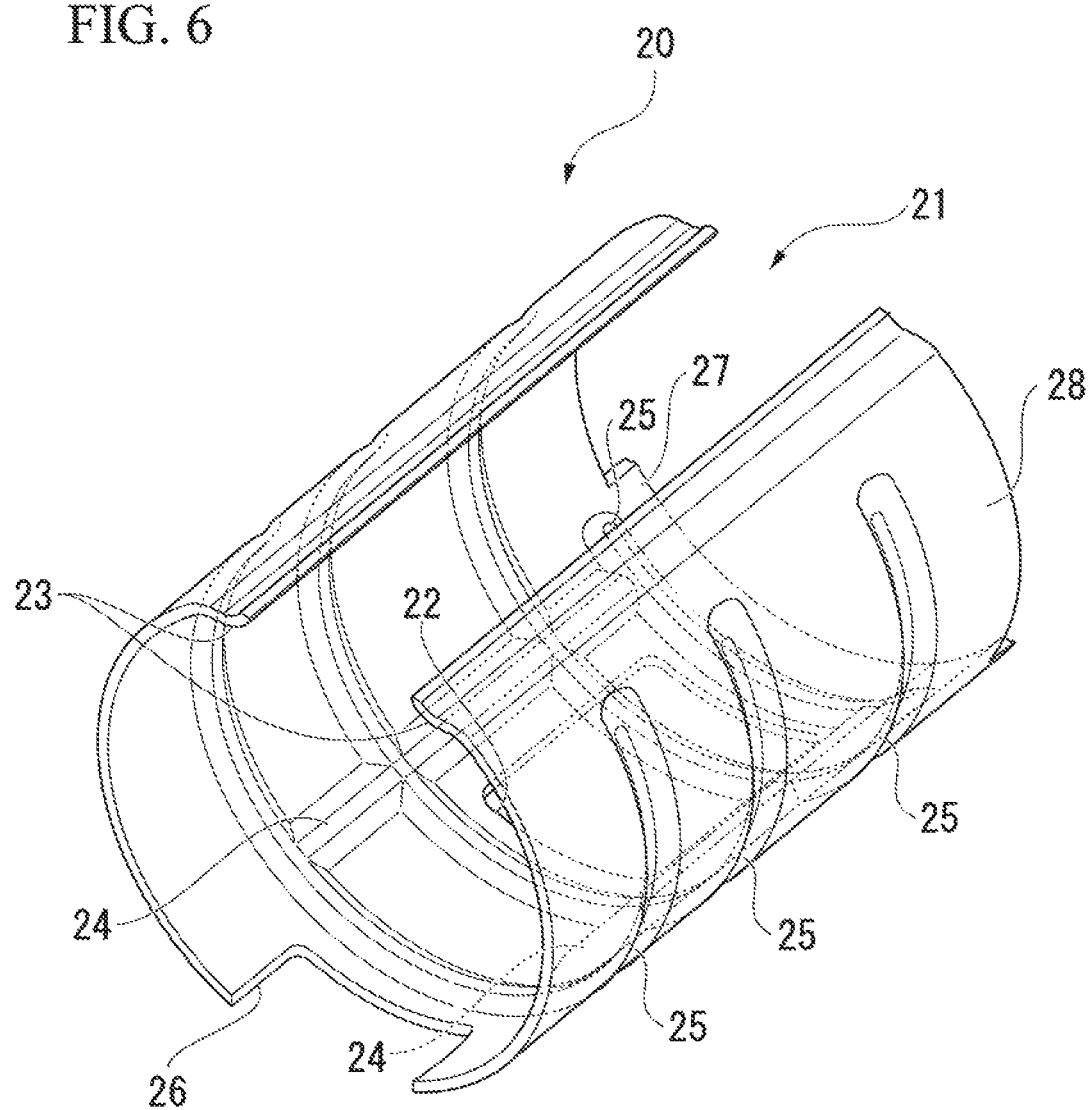
FIG. 6 is a perspective view of a steel-made collar member of the inflator provided in the air bag device of the embodiment of the aspect of the present invention.
Figure 7:
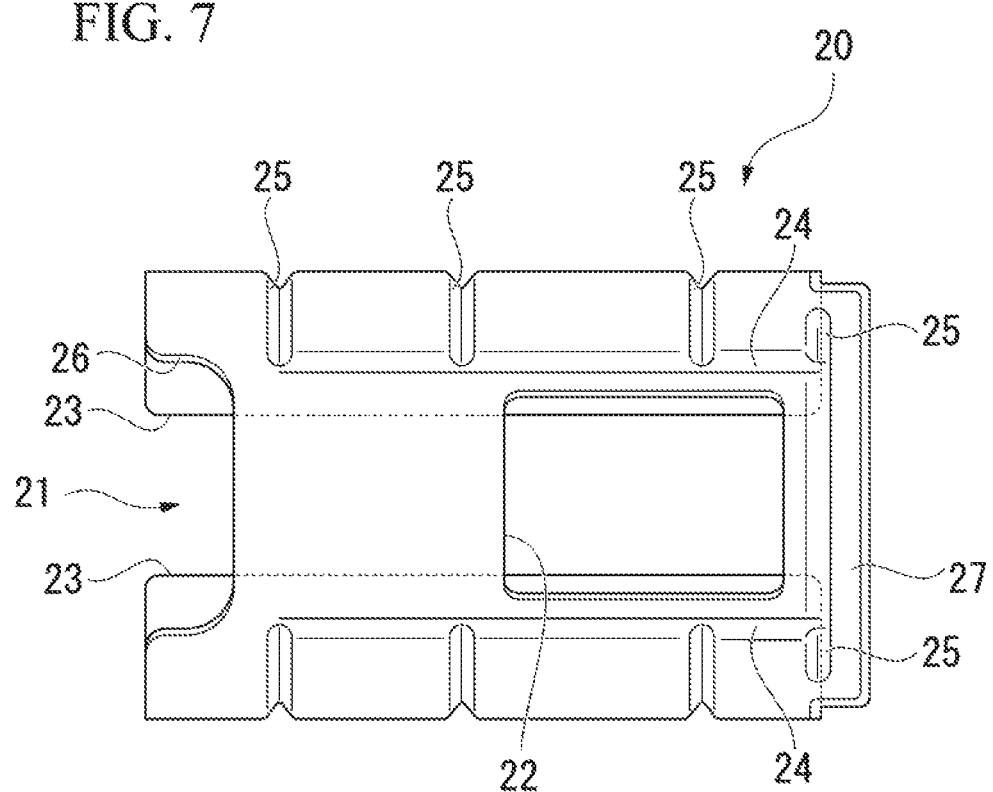
FIG. 7 is a plan view of a steel-made collar member of the inflator provided in the air bag device of the embodiment of the aspect of the present invention, seen from the side of the inflation and expansion direction.

The steel-made collar member 20 is a component attached in the gas injection holes formation area R, and disposed between the resin-made collar members fixed to the end part of the inflator main body 10. FIG. 6 is a perspective view of the steel-made collar member 20. FIG. 7 is a plan view of the steel-made collar member 20 seen from the side of the inflation and expansion direction (that is, from the passenger seat side).

The steel-made collar member 20 is a component made of steel material, and in substantially circular tubal shape (cylindrical shape) surrounding the inflator main body 10. The steel-made collar member 20 has a notch opening 21 (notch part), formed in the inflation and expansion direction. The notch opening is formed along the full length of the steel-made collar member 20 in the axis core direction. As the notch opening 21 is formed, cross-sectional shape of the steel-made collar member 20 is substantially in C-shape (refer to FIG. 5). Also, the steel-made collar member 20 has a bottom bore opening 22 (notch part) on an opposite side of the notch opening 21 (that is, opposite side of the inflation and expansion direction of the bag body 2). The notch opening 21 and the bottom bore opening 22 are formed, interposing an axis core L (refer to FIG. 5). Either one of the notch opening 21 and the bottom bore opening 22 corresponds to the notch part of the aspect of the present invention. That is to say, in the present embodiment, the notch parts are formed on both sides interposing the axis core L of the inflator main body 10.

Also, as shown in FIG. 6, curb parts 23 (abutting parts) of the steel-made collar member 20, which is fronting the notch opening 21 and is locally curved, protrude inwards in the radial direction of the inflator main body 10. These curb parts 23 as above are made to be abutting parts which abut the circumferential surface of the inflator main body 10. Also, in a place displaced in the circumferential direction of the inflator main body 10 with respect to the bottom bore opening 22 which is one among the two notch parts, linear ribs 24 are formed extending in a linear fashion along an edge of the bottom bore opening 22 (that is, along the axis core direction of the inflator main body 10). There linear ribs 24 reinforce the steel-made collar member 20, are made to be abutting parts which abut the circumferential surface of the inflator main body 10. That is to say, the linear ribs 24 protrude inwards in the radial direction of the inflator main body 10 at the similar height as those of the curb parts 23. In addition, the linear ribs 24 abut the circumferential surface of the inflator main body 10 in a similar way as the curb parts 23.

As shown in FIG. 5, two of the curb parts 23 and two of the linear ribs 24 which function as the abutting parts are aligned with an equal pitch in the circumferential direction. That is, in the present embodiment, the steel-made collar member 24 has abutting parts against the inflator main body 10 at positions of point symmetry at the axis core L as a center (positions located in the opposite direction from the center, and the distance of the positions from the center is the same), in a cross section orthogonal to the axis core L of the inflator main body 10. Also, an inscribed circle in contact with tips of two of the curb parts 23 and two of the linear ribs 24 is made to be slightly smaller in diameter than the inflator main body 10. In this way, when attaching the steel-made collar member 20 to the inflator main body 10, two of the curb parts 23 and two of the linear ribs 24 are pressed against the circumferential surface of the inflator main body 10 by restoring force of the steel-made collar member, and position of the steel-made collar member is stabilized.

Also, as shown in FIGS. 6 and 7, the steel-made collar member 20 has curved ribs 25 extending in the circumferential direction of the inflator main body 10. Four of curved ribs 25 are formed, aligned in a coaxial direction, including the position displaced in the axis core direction of the inflator main body 10 with respect to the bottom bore opening 22. These curved ribs 25 reinforce the steel-made collar member 20. The curved rib 25 may be made to abut the inflator main body 10 by making the same amount of protrusion as the liner rib 24. Also, for example, the curbed rib 25 may be made not to abut the inflator main body 10 by reducing the amount of protrusion compared to that of the linear rib 24. In case making the curved rib 25 with the same amount of protrusion as that of the linear rib 24 to abut the inflator main body 10, three places which are the curb part 23, the linear rib 24 and the curved rib 25 are made to abut the inflator main body 10. In this way, the curb part 23, the linear rib 24 and the curved rib 25 are pressed against the inflator main body 10 by the restoring force of the steel-made collar member 20. For this reason, the position of the steel-made collar member 20 with respect to the inflator main body 10 is stabilized by a so-called three-contact spring effect, and thus, it is possible to prevent displacement by vehicle vibration or the like, or generation of noise.

In the steel-made collar member 20 as above, the bottom bore opening 22 is surrounded by the linear rib 24 and the curved rib 25. Thus, decrease of strength by forming the bottom bore opening 22 is possible to be compensated by the linear rib 24 and the curved rib 25. Furthermore, by adjusting the diameter or number of the linear rib 24 and the curved rib 25, it is possible to adjust restoring force when the steel-made collar member 20 is expanded its diameter. The steel-made collar member 20 is expanded its diameter so as to expand the notch opening 21 at the time of attaching to the inflator main body 10. Therefore, the diameter or the number of the linear rib 24 and the curved 25 are set so that the restoring force after attaching is to be a proper retaining force for the steel-made collar member 24 to being fixed to the inflator main body 10.

Also, the steel-made collar member 20 has an end part notch 26 (notch part) in an end part of one side as shown in FIG. 4 C. The end part notch 26 is, like the bottom bore opening 22, formed on the opposite side of the notch opening 21 interposing the axis core L of the inflator main body 10. The end part notch 26, like the notch opening 21 and the bottom bore opening 22, corresponds to the notch part of the aspect of the present invention. That is to say, in the present embodiment, the notch parts are formed on both sides interposing the axis core L of the inflator main body 10, also in the end part of the steel-made collar member 20.

Also, the steel-made collar member 20 has a projection part 27 (position restriction part) which projects in the axis core direction of the inflator main body 10 at an opposite end part of the end part at which the end part notch 26 is formed. The projection part 27 is disposed so as to intrude into inside of a concave part 30a, which is to be described later. By this, when the steel-made collar member 20 is to move in the circumferential direction with respect to the inflator 10, and when the steel-made collar member 20 is to move towards the side of the resin-made collar member 30 where the concave part 30a is formed with respect to the inflator 10, the projection part 27 and the resin-made collar member 30 interfere with each other, resulting in restricting of the movement of the steel-made collar member 20.

In the steel-made collar member 20 as above, excluding two of the curb parts 23, two of the linear ribs 24 which function as the abutting parts and the projection part 27, an area facing the gas injection holes 11 of the inflator main body 10 functions as a gas jet reception part 28 to receive the injected gas from the gas injection holes 11. As shown in FIG. 5, the gas jet reception part 28 as above is disposed so as to face the circumferential surface of the inflator main body 10 across a predetermined space (There is a space between the gas jet reception part 28 and the circumferential surface of the inflator main body 10) because two of the curb parts 23 and two of the linear ribs 24 which function as the abutting parts abut the inflator main body 10. That is to say, in the present embodiment, the steel-made collar member 20 has the gas jet reception part 28 that is disposed so as to face the gas injection hole formation area R, where the gas injection holes 11 of the inflator main body 10 are formed, across a space.

As shown in FIG. 4, the resin-made collar member 30 are components fixed to each of the end part of the inflator main body 10, and is formed of resin. Each of the resin-made collar members 30 is disposed so as to cover the inflator main body 10 from the outside in the radial direction. As shown in FIG. 4 A, among these two of the resin-made collar member 30, one of the resin-made collar member 30 disposed on the side of the projection part 27 of the steel-made collar member 20 has the concave part 30a in which the projection part 27 is disposed.

In the air bag device 1 of the present embodiment as above configuration, when a signal to indicate a collision is input to the inflator main body 10 from the ECU which is not shown in drawings, explosive accommodated inside the inflator main body 10 is ignited by ignition equipment and gas is generated. The gas generated inside the inflator main body 10 in this way is injected out from the gas injection holes 11 and supplied to the bag body 2. By this way, the bag body 2 is inflated and expanded.

Here, the air bag device 1 and inflator 3 of the present embodiment includes the inflator main body 10 which has the tubular shape and has a plurality of gas injection holes 11 on the circumferential surface, and the steel-made collar member 20 which has the gas jet reception part 28 that is disposed so as to face the gas injection holes formation area R of the inflator main body 10 across a space. That is, in the air bag device 1 and inflator 3 of the present embodiment, the steel-made collar member 20 is disposed so as to face the gas injection holes formation area R of the inflator main body 10 across a space. Thus, it is prevented that the steel-made collar member 20 directly block the gas injection holes 11, and also it is prevented that the steel-made collar member 20 obstructs the gas injection from the gas injection holes 11. Therefore, according to the air bag device 1 and the inflator 3 of the present embodiment, it is possible to inject the gas from the inflator main body 10 smoothly, even in the cases where the steel-made collar member 20 is fixed to the inflector main body 10.

Also, injected gas from the inflator main body 10 is at high temperature as generated by combustion of explosive. On the contrary to this, the maximum temperature of the steel-made collar member 20 within the actual operating range is far lower compared to the temperature of the gas. Therefore, by hitting the injected gas from the inflator main body 10 against the steel-made collar member 20 once, it will enable lowering of the temperature of the gas hitting the bag body 2. Therefore, according to the air bag device 1 and inflator 3 of the present embodiment, it is possible to reduce the heat influence to the bag body 2, and also possible to alleviate the countermeasure against heat of the bag body 2. Especially in the air bag device 1 and inflator 3 of the present embodiment, the steel-made collar member 20 has a shape to cover the entire area lateral (a side in the direction orthogonal to the inflation and expansion direction of the bag body 2) to the gas injection holes formation area R. Therefore, it is possible to reduce the temperature of the gas injected from the lateral side and supply to the bag body, and enables the gas in high temperature state to be prevented from hitting the bag body 2.

Also, in the air bag device 1 and inflator 3 of the present embodiment, the steel-made collar member 20 has the abutting parts (the curb part 23 and the linear rib 24) which abut the circumferential surface of the inflator main body 10 at positions of point symmetry at the axis core L of the inflator main body 10 as the center, in the cross section orthogonal to the axis core L of the inflator main body 10. By this way, as the same amount of gas is injected on both sides interposing the axis core L of the inflator main body, reaction forces of gas injection received on both places interposing the axis core L of the inflator main body 10 is kept constant, preventing the generation of the thrust force with respect to the inflator main body 10. Therefore, it is possible to support the inflator 3 even at the time of gas injection.

Also, in the air bag device 1 and inflator 3 of the present embodiment, the steel-made collar member 20 (that is, the gas jet reception part 28) has the notch parts (the notch opening 21, the bottom bore opening 22 and the end part notch 26) on both sides interposing the axis core L, in the cross section orthogonal to the axis core L of the inflator main body 10. Due to this, even smoother gas injection outwards is possible. In addition, in places where the notch parts are provided, reaction forces of gas injection counterbalances interposing the axis core L of the inflator main body 10, preventing the generation of the thrust force with respect to the inflator main body 10. Therefore, according to the air bag device 1 and inflator 3 of the present embodiment, it is possible to make the gas injection even smoother, and also possible to support the inflator 3 stably even at the time of gas injection.

Also, the air bag device 1 and inflator 3 of the present embodiment includes the curved rib 25 which is formed in the place displaced in the axis core direction of the inflator main body 10 with respect to the bottom bore opening 22 and extends in the circumferential direction of the inflator main body 10. This enhances the strength of the surroundings of the bottom bore opening 22, preventing the plastic deformation of the steel-made collar member 20 at the time of mounting to the inflator main body 10.

Furthermore, it is possible to adjust the restoring force of the steel-made collar member 20 by the curved rib 25 when the steel-made collar member is expanded its diameter. For example, it is possible to adjust an opening angle (an opening width of the notch opening 21) in case where the steel-made collar member 20 is opened by a certain amount of force. That is to say, with the curved rib 25 provided, by adjusting the cross-sectional shapes of the places where the curved ribs 25 are formed and changing section modulus, it is also possible to adjust the opening angle in case where the steel-made collar member 20 is opened. Due to this, it is possible to adjust the opening angle of the steel-made collar member 20 at the time of gas injection, which also makes it possible to adjust the opening angle of the steel-made collar member 20 so that the gas is injected properly.

Also, the air bag device 1 and inflator 3 of the present embodiment includes the linear rib 24 which is formed in the place displaced in the circumferential direction of the inflator main body 10 with respect to the bottom bore opening 22 and extends in the direction of the axis core of the inflator main body. This enhances the strength of the surroundings of the bottom bore opening 22, preventing the plastic deformation of the steel-made collar member 20 at the time of mounting to the inflator main body 10. Furthermore, it is possible to adjust the opening angle of the steel-made collar member 20.

Also, the air bag device 1 and inflator 3 of the present embodiment includes the resin-made collar member 30 which is fixed to the inflator main body 10 and covers the end part of the inflator main body 10 from outside in the radial direction of the inflator main body 10, and the steel-made collar member 20 has the projection part 27 which is configured to restrict the displacement by abutting on the resin-made collar member 30 with respect to the inflator main body 10. This enables to prevent the steel-made collar member 20 from displacing with respect to the inflator main body 10 at the time of the gas injection. Furthermore, it is possible to easily position the steel-made collar member 20 with respect to the inflator main body 10 at the time of assembly by using the projection part 27 as a mark.

As above, preferable embodiment of the aspect of the present invention is described, referring to the drawings, however, the scope of the present invention is not limited to the embodiment described above. Shapes, combinations or the like of each constituent element indicated in the above-described embodiment is an example, and various modifications according to the design requirements or the like is possible without departing from the scope of the invention.

For example, in the above embodiment, an example to apply the air bag device and inflator of the aspect of the present invention to SRS (Supplemental Restraint System) for a passenger seat is described. However, the present invention is not limited thereto, and may apply to other air bag devices.

Also, in the above embodiment, an example in which the collar member of the aspect of the present invention is the steel-made collar member 20 is described. However, the present invention is not limited thereto, and may apply a collar member made of material other than steel.

What is claimed is:

1. An inflator, comprising:
an inflator main body which is has a tubular shape and has a plurality of gas injection holes on a circumferential surface; and
a collar member which has a gas jet reception part that is disposed so as to face a formation area of the gas injection holes of the inflator main body across a space, wherein the gas jet reception part has notch parts on both sides interposing an axis core of the inflator main body, in the cross section orthogonal to the axis core of the inflator main body, the notch parts being not continued with each other.

2. The inflator according to claim 1, wherein the collar member has abutting parts which abut the circumferential surface of the inflator main body at positions of point symmetry at an axis core of the inflator main body as a center, in a cross section orthogonal to the axis core of the inflator main body.

3. The inflator according to claim 1, wherein one of the notch parts is formed along a full length of the collar member in the axis core direction.

4. The inflator according to claim 1,
wherein the collar member has a curved rib which is formed in a place displaced in the axis core direction of the inflator main body with respect to at least one among two of the notch parts and extends in a circumferential direction of the inflator main body.

5. The inflator according to claim 1,
wherein the collar member has a linear rib which is formed in a place displaced in the circumferential direction of the inflator main body with respect to at least one among two of the notch parts and extends in a direction of the axis core of the inflator main body.

6. The inflator according to any one of the claim 1, further comprising:
a cover member which is fixed to the inflator main body and covers an end part of the inflator main body from outside in a radial direction of the inflator main body,
wherein the collar member has a position restriction part which is configured to restrict a displacement by abutting on the cover member with respect to the inflator main body.

7. An air bag device, comprising:
a bag body; and
an inflator configured to inject a gas to inflate the bag body,
wherein the inflator according to claim 1 is included as the inflator.

8. An inflator, comprising:
an inflator main body which is has a tubular shape and has a plurality of gas injection holes on a circumferential surface; and
a collar member which has a gas jet reception part that is disposed so as to face a formation area of the gas injection holes of the inflator main body across a space,
wherein the gas jet reception part has notch parts on both sides interposing the axis core, in the cross section orthogonal to the axis core of the inflator main body, and
wherein the collar member has a curved rib which is formed in a place displaced in the axis core direction of the inflator main body with respect to at least one among two of the notch parts and extends in a circumferential direction of the inflator main body.

9. An inflator, comprising:
an inflator main body which has a tubular shape and has a plurality of gas injection holes on a circumferential surface;
a collar member which has a gas jet reception part that is disposed so as to face a formation area of the gas injection holes of the inflator main body across a space; and
a cover member which is fixed to the inflator main body and covers an end part of the inflator main body from outside in a radial direction of the inflator main body,
wherein the collar member has a position restriction part which is configured to restrict a displacement by abutting on the cover member with respect to the inflator main body.

* * * * *